United States Patent
Öman (10) Patent No.: US 8,543,674 B2
(45) Date of Patent: Sep. 24, 2013

(54) CONFIGURATION OF ROUTERS FOR DHCP SERVICE REQUESTS

(75) Inventor: Andreas Öman, Stockholm (SE)

(73) Assignee: Packetfront Network Products AB, Kista (SE)

( * ) Notice: Subject to any disclaimer, the term of this patent is extended or adjusted under 35 U.S.C. 154(b) by 593 days.

(21) Appl. No.: 12/682,360

(22) PCT Filed: Oct. 3, 2008

(86) PCT No.: PCT/EP2008/063270
§ 371 (c)(1),
(2), (4) Date: Aug. 9, 2010

(87) PCT Pub. No.: WO2009/047215
PCT Pub. Date: Apr. 16, 2009

(65) Prior Publication Data
US 2010/0312818 A1 Dec. 9, 2010

(30) Foreign Application Priority Data
Oct. 12, 2007 (EP) ..................................... 07118409

(51) Int. Cl.
*G06F 15/16* (2006.01)
(52) U.S. Cl.
USPC .......................................... 709/222; 709/202
(58) Field of Classification Search
USPC ......................................... 709/202, 203, 222
See application file for complete search history.

(56) References Cited

U.S. PATENT DOCUMENTS

| 5,586,255 | A | 12/1996 | Tanaka et al. |
| 5,659,736 | A | 8/1997 | Hasegawa et al. |
| 5,684,988 | A | 11/1997 | Pitchaikani et al. |
| 5,689,598 | A | 11/1997 | Dean, Jr. et al. |
| 5,802,042 | A | 9/1998 | Natarajan et al. |
| 5,832,503 | A | 11/1998 | Malik et al. |
| 5,913,037 | A | 6/1999 | Spofford et al. |
| 6,028,769 | A | 2/2000 | Zurek |
| 6,059,614 | A | 5/2000 | Shelby et al. |
| 6,122,639 | A | 9/2000 | Babu et al. |

(Continued)

FOREIGN PATENT DOCUMENTS

| EP | 1 039 698 | 9/2000 |
| EP | 1780941 | 5/2007 |

(Continued)

OTHER PUBLICATIONS

Bodzinga, Anne, et al., "Interworking IPTV Services with IMS", Telecommunications Network Strategy and Planning Symposium 2006 pp. 1-5.

(Continued)

*Primary Examiner* — Kostas Katsikis
(74) *Attorney, Agent, or Firm* — Faegre Baker Daniels LLP (57) ABSTRACT

A method of configuring a router to provide DHCP IP address services to a number of network clients sending messages to the router to request IP addresses, the network clients connecting to a network via the router which is under the control of a control system, the method includes obtaining configuration instructions for the router by sending messages from the router to the control system to request configurations for DHCP services, sending configuration instructions from the control system to the router, and configuring the router in accordance with the configuration instructions.

18 Claims, 5 Drawing Sheets

(56) References Cited

U.S. PATENT DOCUMENTS

| | | | |
|---|---|---|---|
| 6,222,852 B1 | 4/2001 | Gandy | |
| 6,233,616 B1 * | 5/2001 | Reid | 709/225 |
| 6,286,038 B1 * | 9/2001 | Reichmeyer et al. | 709/220 |
| 6,393,472 B1 | 5/2002 | Anerousis et al. | |
| 6,430,621 B1 | 8/2002 | Srikanth et al. | |
| 6,560,236 B1 | 5/2003 | Varghese et al. | |
| 6,680,945 B1 | 1/2004 | Merchant et al. | |
| 6,769,124 B1 | 7/2004 | Schoening et al. | |
| 6,839,749 B1 | 1/2005 | Bera | |
| 6,876,667 B1 | 4/2005 | Synnestvedt et al. | |
| 6,885,657 B1 | 4/2005 | Rabenko et al. | |
| 6,954,436 B1 | 10/2005 | Yip et al. | |
| 6,958,996 B2 * | 10/2005 | Xiong | 370/389 |
| 7,054,309 B1 | 5/2006 | Hoot et al. | |
| 7,082,463 B1 | 7/2006 | Bradley et al. | |
| 7,099,158 B1 | 8/2006 | Bjorklund | |
| 7,139,818 B1 | 11/2006 | Kinnear, Jr. et al. | |
| 7,200,145 B1 | 4/2007 | Edsall et al. | |
| 7,218,827 B2 | 5/2007 | Vongseng et al. | |
| 7,222,359 B2 * | 5/2007 | Freund et al. | 726/3 |
| 7,290,046 B1 * | 10/2007 | Kumar | 709/223 |
| 7,293,077 B1 * | 11/2007 | Teo et al. | 709/221 |
| 7,386,629 B2 * | 6/2008 | Rover et al. | 709/238 |
| 7,467,229 B1 | 12/2008 | Briggs et al. | |
| 7,536,464 B1 * | 5/2009 | Dommety et al. | 709/228 |
| 7,581,024 B1 | 8/2009 | Yip et al. | |
| 7,640,287 B1 * | 12/2009 | Gai et al. | 709/200 |
| 7,640,340 B1 * | 12/2009 | Stapp et al. | 709/224 |
| 7,702,732 B1 * | 4/2010 | Squire et al. | 709/206 |
| 7,711,826 B2 * | 5/2010 | Ford | 709/227 |
| 7,760,984 B2 | 7/2010 | Solheid et al. | |
| 7,788,345 B1 * | 8/2010 | Sukiman et al. | 709/220 |
| 7,801,133 B2 | 9/2010 | Siegel | |
| 7,826,463 B2 | 11/2010 | Patel et al. | |
| 7,882,169 B1 * | 2/2011 | Droms et al. | 709/203 |
| 7,929,452 B2 * | 4/2011 | Diamant et al. | 370/252 |
| 7,945,164 B2 | 5/2011 | Theodoras, II | |
| 7,948,993 B2 | 5/2011 | Kini et al. | |
| 7,966,409 B1 * | 6/2011 | Daruwalla et al. | 709/228 |
| 7,969,880 B2 | 6/2011 | Yano et al. | |
| 7,983,190 B2 | 7/2011 | Hirota | |
| 7,990,994 B1 | 8/2011 | Yeh et al. | |
| 8,054,804 B2 * | 11/2011 | Small et al. | 370/331 |
| 8,098,659 B2 * | 1/2012 | Shida | 370/252 |
| 8,296,400 B2 * | 10/2012 | Gorthy et al. | 709/220 |
| 8,296,438 B2 * | 10/2012 | Brown et al. | 709/227 |
| 2002/0023174 A1 | 2/2002 | Garrett et al. | |
| 2002/0075844 A1 | 6/2002 | Hagen | |
| 2002/0103878 A1 * | 8/2002 | Moncibais | 709/217 |
| 2002/0161801 A1 | 10/2002 | Hind et al. | |
| 2003/0039249 A1 | 2/2003 | Basso et al. | |
| 2003/0056225 A1 | 3/2003 | Bione | |
| 2003/0131107 A1 | 7/2003 | Godse et al. | |
| 2003/0165140 A1 | 9/2003 | Tang et al. | |
| 2003/0200285 A1 | 10/2003 | Hansen et al. | |
| 2003/0206548 A1 | 11/2003 | Bannai et al. | |
| 2004/0013126 A1 | 1/2004 | Yun | |
| 2004/0017829 A1 | 1/2004 | Gray et al. | |
| 2004/0047353 A1 | 3/2004 | Umayabashi et al. | |
| 2004/0049568 A1 | 3/2004 | Nguyen et al. | |
| 2004/0052216 A1 * | 3/2004 | Roh | 370/252 |
| 2004/0090965 A1 | 5/2004 | Lin | |
| 2004/0128367 A1 * | 7/2004 | Piercy et al. | 709/220 |
| 2004/0160464 A1 | 8/2004 | Reyna | |
| 2004/0172412 A1 | 9/2004 | Files et al. | |
| 2004/0213152 A1 | 10/2004 | Matuoka et al. | |
| 2004/0258074 A1 | 12/2004 | Williams et al. | |
| 2004/0267949 A1 * | 12/2004 | Rover et al. | 709/230 |
| 2005/0044265 A1 * | 2/2005 | Vinel et al. | 709/238 |
| 2005/0049886 A1 | 3/2005 | Grannan et al. | |
| 2005/0129379 A1 | 6/2005 | Reagan et al. | |
| 2005/0216584 A1 | 9/2005 | Chisholm | |
| 2005/0281526 A1 | 12/2005 | Vongseng et al. | |
| 2005/0286517 A1 | 12/2005 | Babbar et al. | |
| 2006/0002324 A1 * | 1/2006 | Babbar et al. | 370/325 |
| 2006/0026228 A1 | 2/2006 | Kim | |
| 2006/0047791 A1 * | 3/2006 | Bahl | 709/220 |
| 2006/0085532 A1 | 4/2006 | Chu et al. | |
| 2006/0261116 A1 | 11/2006 | Brandeis | |
| 2006/0277603 A1 | 12/2006 | Kelso et al. | |
| 2007/0058538 A1 * | 3/2007 | Chiang et al. | 370/230 |
| 2007/0058638 A1 | 3/2007 | Guichard et al. | |
| 2007/0061458 A1 * | 3/2007 | Lum | 709/225 |
| 2007/0168547 A1 | 7/2007 | Krywaniuk | |
| 2007/0174522 A1 | 7/2007 | Lee | |
| 2007/0203999 A1 | 8/2007 | Townsley et al. | |
| 2007/0286198 A1 | 12/2007 | Muirhead et al. | |
| 2008/0162609 A1 * | 7/2008 | Bigian et al. | 707/205 |
| 2008/0219281 A1 | 9/2008 | Akin et al. | |
| 2008/0285569 A1 | 11/2008 | Stademann et al. | |
| 2011/0161360 A1 | 6/2011 | Lundstrom | |

FOREIGN PATENT DOCUMENTS

| | | |
|---|---|---|
| GB | 2 069 767 | 1/1981 |
| KR | 2001/0038481 | 5/2001 |
| WO | WO9534975 A1 | 12/1995 |
| WO | WO 9826549 A1 * | 6/1998 |
| WO | WO 00 60864 | 10/2000 |
| WO | WO 02/35797 | 5/2002 |
| WO | WO 2008/068316 | 6/2008 |
| WO | WO 2008/113852 | 9/2008 |
| WO | WO 2008/113854 | 9/2008 |
| WO | WO 2009007327 A1 * | 1/2009 |
| WO | WO 2009/019300 | 2/2009 |
| WO | WO 2009/027513 | 3/2009 |
| WO | WO 2009/035719 | 3/2009 |
| WO | WO 2009/047334 | 4/2009 |
| WO | WO 2009/047345 | 4/2009 |

OTHER PUBLICATIONS

Cohen, Reuven, et al., "Video-on-Demand Session Management", IEEE Journal on Selected Areas in Communications vol. 14, No. 6.

European Search Report issued in EP Application 06125497, Publication 1931085, mailed Jan. 9, 2009, 8 pages.

International Search Report and Written Opinion for PCT/EP2008/053369, mailed Jul. 2, 2008, 10 pages.

International Search Report and Written Opinion for PCT/EP2008/060384, mailed Nov. 11, 2008, 10 pages.

International Search Report and Written Opinion for PCT/EP2008/061403, mailed Dec. 18, 2008, 12 pages.

International Search Report and Written Opinion for PCT/EP2007/063467, mailed Mar. 4, 2008, 7 pages.

International Search Report for PCT/EP2008/053374, mailed Sep. 25, 2009, 3 pages.

International Search Report and Written Opinion for PCT/EP2008/056563, mailed Aug. 21, 2008, 11 pages.

International Search Report for PCT/EP2008/063667, mailed Jul. 30, 2009, 3 pages.

International Search Report for PCT/EP2008/063639, mailed Oct. 1, 2009, 2 pages.

International Search Report for PCT/EP2008/063270, mailed Jan. 21, 2009, 3 pages.

International Search Report and Written Opinion for PCT/EP2008/056565, mailed Jan. 19, 2009.

European Search Report issued in EP Application 07104707, Publication 1973269, dated Aug. 27, 2007, 7 pages.

Pezeshki, Ali et al., "A network for recursive extraction of canonical coordinates" Neural Networks 16 (2003) 801-808.

* cited by examiner

Fig. 1

PRIOR ART

Fig. 2

PRIOR ART

Fig. 3

PRIOR ART

CONFIGURATION OF ROUTERS FOR DHCP SERVICE REQUESTS

CROSS-REFERENCE TO RELATED APPLICATIONS

The present application is a national phase application of PCT/EP2008/063270, filed pursuant to 35 U.S.C. §371, which claims priority to EP 07118409.7, filed Oct. 12, 2007. Both applications are incorporated herein by reference in their entirety.

TECHNICAL FIELD

This invention relates to the configuration of network elements such as routers to effectively handle requests for IP addresses using Dynamic Host Configuration Protocal (DHCP).

BACKGROUND ART

Figure 1:
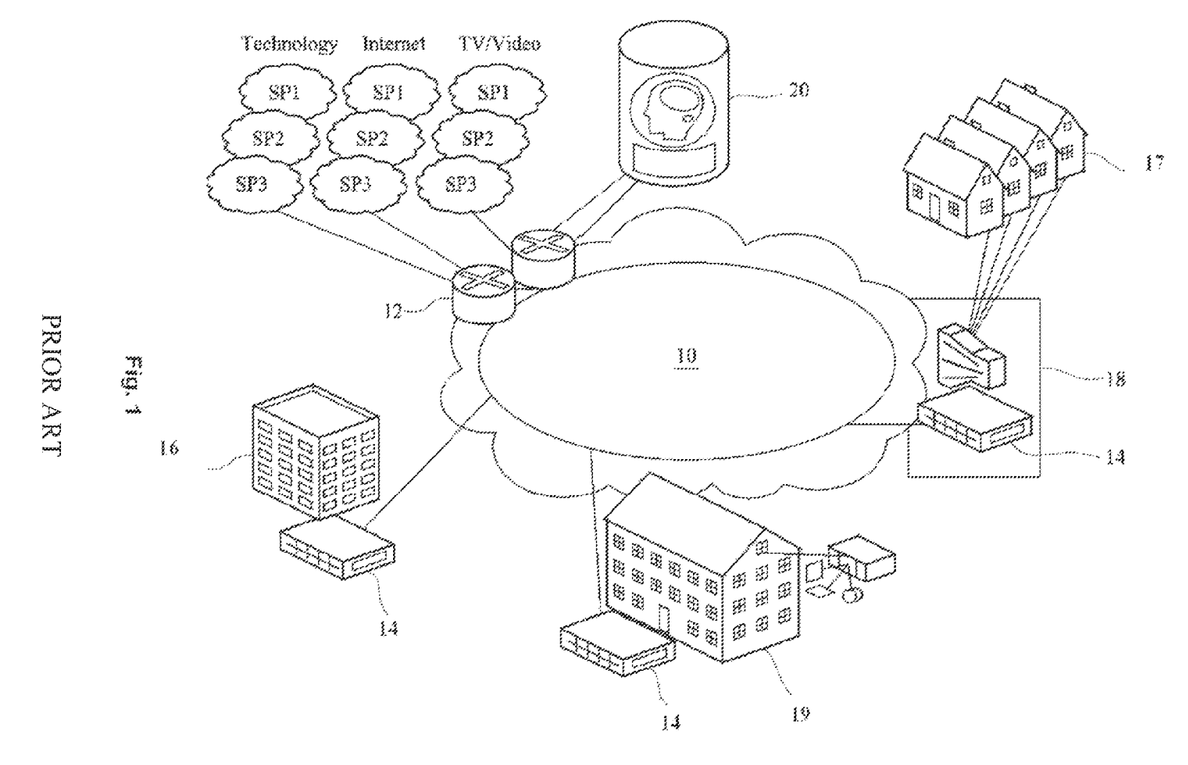
FIG. 1 shows a schematic view of a generic broadband network.

FIG. 1 shows a generic description of a broadband network for providing telephone, internet and TV/video services to subscribers in a number of locations. A series of service providers provide the various services (SP1, SP2, SP3) to the network 10 via conventional access points 12. The network 10 provides connection to these subscribers via routers 14 located close to the subscribers. The subscribers can include business locations that can include routers in commercial property 16, and domestic subscribers with routers located in a central office 18 for a neighbourhood of separate dwellings (houses 17), or in a single building 19 such as an apartment. A network operator manages the network function by the use of a control and provisioning system 20. The present invention is particularly applicable to such networks.

Figure 2:
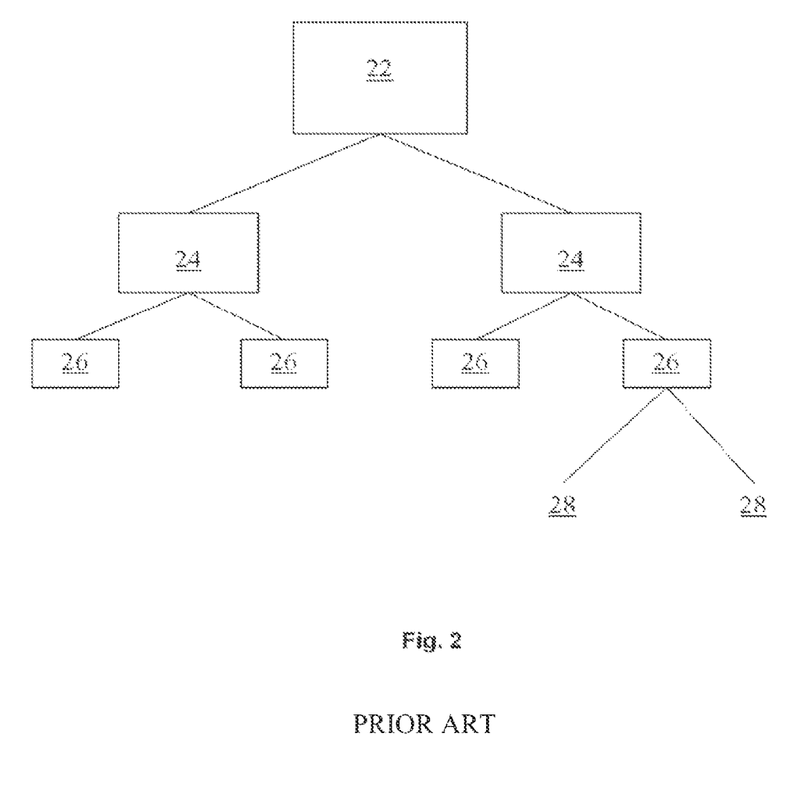
FIG. 2 shows a schematic view of the functional elements of a network.

For the function of the control and provisioning system 20, the network can be considered in an abstract way as comprising a core 22 having one or more cells 24, each cell having one or more network elements 26 as is shown in FIG. 2. Subscribers 28 connect to the network elements 26. This structure is not to be confused with the physical elements making up the network. The functional blocks 22, 24, 26 may be wholly or partly resident in the same or different physical elements, depending on the exact size and makeup of the network in question, although typically, each network element 26 will comprise a router. The subscribers (network clients) can comprises a PC or other connected network device.

Internet Protocol (IP) is the common form of communication used in most networks. Data communication using IP relies on addressing for the various parts of the network to be able to communicate with each other. An IP address (Internet Protocol address) is a unique address that certain electronic devices use in order to identify and communicate with each other on a computer network utilizing the Internet Protocol standard (IP). Any participating network device—including routers, computers, time-servers, printers, Internet fax machines, and some telephones—can have their own unique address.

IP addresses can be static or dynamic. A static IP address is one in which a device uses the same address every time a user logs on to a network. With a static IP address, a computer's identity can be easily identified by others, and users can easily connect with it. Such an approach is commonly used for websites, email servers and the like.

A dynamic IP address is one in which the address is assigned to a device, usually by a remote server which is acting as a Dynamic Host Configuration Protocol (DHCP) server. IP addresses assigned using DHCP may change depending on the addresses available in the defined pool assigned to that server. Dynamic IP addresses are used because they provide efficient use of a limited pool of available addresses. When there is no need to assign a specific IP Address to each device, users can simply log in and out and use the network without having to have previously obtained an assigned IP address.

The Dynamic Host Configuration Protocol (DHCP) is a set of rules used by communications devices to allow the device to request and obtain an IP address (and other parameters such as the default gateway, subnet mask, and IP addresses of DNS servers) from a server which has a list of addresses available for assignment. The DHCP server ensures that all IP addresses are unique, e.g., no IP address is assigned to a second client while the first client's assignment is valid (i.e. its 'lease' has not expired). Thus IP address pool management is done by the server and not by a human network administrator.

Figure 3:
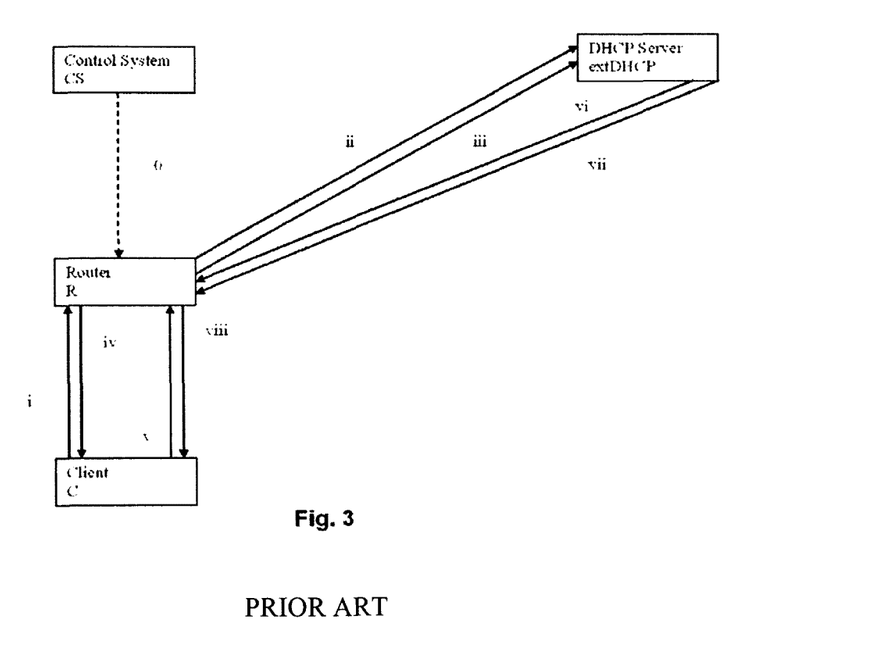
FIG. 3 shows the major steps in DHCP IP address assignment.

The procedure by which an IP address is obtained from a DHCP server is shown schematically in FIG. 3. Before it is possible for a client C to obtain an IP address, it is necessary to configure the router R to which it is attached (step 0). The router R can be configured in the factory (as is the case in many home routers) or can be manually configured by either downloading a configuration file or by connecting to the router by telnet and configuring the code operating the router. Whichever way is used, the configuration is essentially static and includes identification of the DHCP server extDHCP to use for IP address assignment.

On connection to the router R, the client C requests an IP address by sending a DHCP discover message (i) to the router R. On receipt of the DHCP discover, the router R relays it on to the network, including the DHCP server extDHCP (ii). The DHCP server responds to this message by issuing a DHCP offer (indicating that an IP address is available to meet the request) which is communicated to the router R (iii) and is in turn, relayed to the client C (iv). On receipt of the DHCP offer, the client issues a DHCP request to the router R (v) which in turn is relayed to the network (and DHCP server) (vi). The DHCP server assigns a particular IP address and issues an acknowledgement, including the assigned IP address (vii) which in turn is relayed by the router R to the client (viii). Steps v to viii are repeated periodically to maintain the lease to that IP address while the client is connected. In the event that the client disconnects (or is timed out), the IP address is released and steps i to viii must be repeated again to obtain a new IP address.

The static configuration of the router makes it difficult for the network to adapt to the changing needs of the clients.

BRIEF SUMMARY OF THE INVENTION

According to a first aspect of the invention there is provided a method of configuring a router to provide DHCP IP address services to a number of network clients sending messages to the router to request IP addresses, wherein the network clients connect to a network via the router which is under the control of a control system, the method comprising the steps of:
i) obtaining configuration instructions for the router by sending messages from the router to the control system to request configurations for DHCP services;
ii) sending configuration instructions from the control system to the router; and
iii) configuring the router in accordance with the configuration instructions to:

a) act as a DHCP server and provide an IP address in response to at least one client request; and b) act as a relay agent and forward the request from at least one other client to an external DHCP server and to forward an IP address response from the external DHCP server to the client.

By operating the router under the control of the control system, it is possible to have dynamic configuration of the router such that the manner in which a router handles a DHCP request can vary according to the nature of the request.

In one embodiment, the method preferably further comprises analysing the request from the client to determine a service type to which the request relates and creating a configuration instruction according to the determined service type. In this case, the step of obtaining a configuration instruction can comprise creating the configuration instruction in the router from one of a number of configuration templates according to the service type.

In a further embodiment, the method comprises analysing the request from the client to determine a service type to which the request relates; sending a message from the router to the control system to request a configuration for DHCP services according to the determined service type; and sending a configuration instruction from the control system to the router.

The configuration instruction can comprise an instruction including an IP address pool from which the router can assign an address to the client when acting as a DHCP server or an instruction including the identity of the external DHCP server to which the IP address request is relayed.

Where the router act as a relay agent the method can comprise sending relay agent information with the request to the external DHCP server. In such a case, more than one external DHCP server may be identified.

When the router is configured to act as a relay agent, the router may send an update message to the control system when forwarding the IP address from the external DHCP server to the client.

According to a second aspect of the invention there is provided a network system comprisings a number of routers, a number of network clients, and a network control system, wherein each network client connects to a network via an associated router and the router is under the control of the control system, the control system being configured so as to perform the steps of the method in accordance to the first aspect of the invention.

The system may further comprise at least one external DHCP server.

Other changes may be made within the scope of the invention.

DETAILED DESCRIPTION OF OUT THE INVENTION

Figure 4:
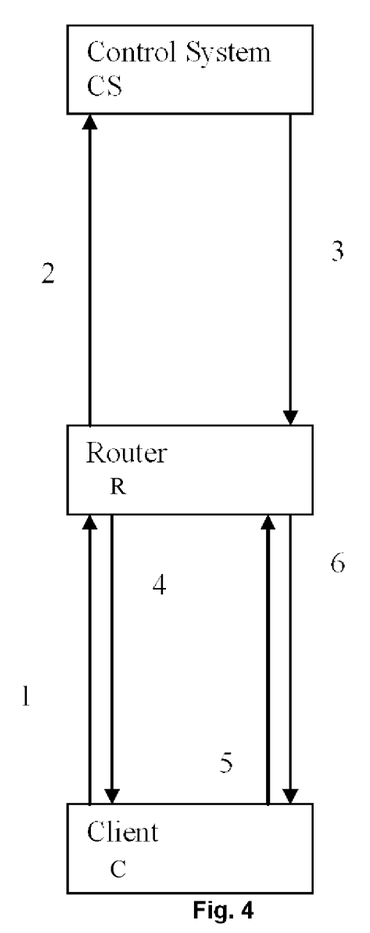
FIG. 4 shows a system according to an embodiment of the invention with a router configured to act as a DHPC server.

Referring now to FIG. 4, in one embodiment of the invention, the router R acts as the DHCP server and provides the IP address. In this case, on connection of the client C, it sends out a DHCP discover 1 as before. On receipt of this, the router R sends a context open message 2 to the control system CS. This provides information such as the interface ID on the router R, MAC address, vendor class ID for the service concerned, etc. On receipt of this message, the control system creates a configuration file establishing service parameters for the requested service (bandwidth, etc) as well as an IP address pool from which at IP address can be assigned. The configuration file (instruction) is transmitted to the router R in a context write, step 3. The configuration file is loaded into the router R which then begins to behave as a DHCP server and sends a DHCP offer on the specified interface to the client C. The steps of DHCP request and acknowledge outlined above are completed between the client C and router R, via steps 5, 6 (repeated in the usual manner to maintain the lease open).

Figure 5:
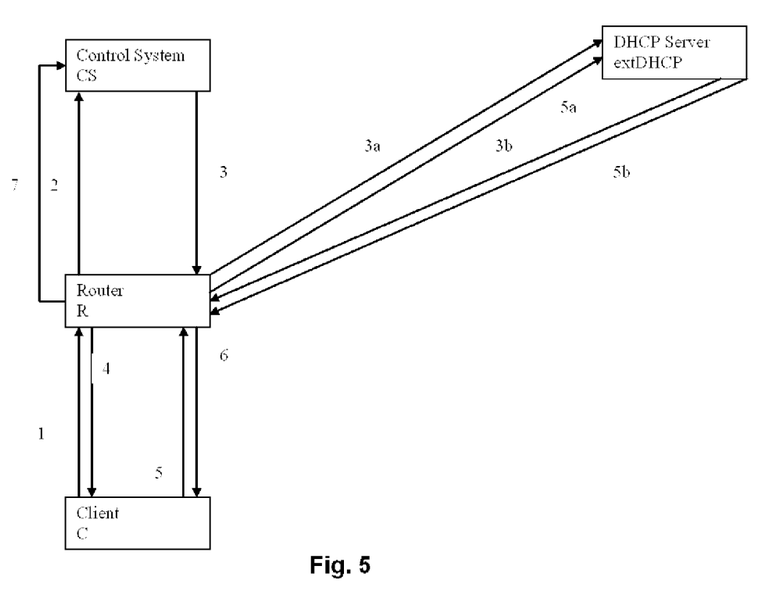
FIG. 5 shows a system according to an embodiment of the invention with a router configured to act as a relay agent with an external DHPC server.

In the embodiment of FIG. 4, the router R acts as a DHCP server for the device connected to the designated interface. In one embodiment, the router acts as a DHCP server for all devices attached to an interface. However, in other cases, it is necessary to be able to use an external DHCP server to provide IP addresses. FIG. 5 shows the system configuration for this case.

In the case of FIG. 5, the DHCP discover and context open steps 1, 2 are as before. However, in this case, the control system responds with the identity of the external DHCP (ext-DHCP) sever to use, step 3 and the router R is configured accordingly. Although only one server is shown, it is possible that more than one can be specified according to the service requested.

The router R relays the DHCP discover to the designated server and includes "option 82" (relay agent) information if not already present, step 3*a*. The DHCP server responds with a DHCP offer, step 3*b*. This is relayed to the client C, step 4. The client C then responds with a DHCP request, step 5 as before. This is relayed by the router R to the DHCP server 5*a*. The server responds with a DHCP acknowledgement, step 5*b* which is relayed to the client C by the router R, step 6. The router also sends a context update, step 7 to the control system CS so that the address and service assignment to the client C on the relevant interface can be known to the control system. Steps 5, 5*a*, 5*b* and 6 are repeated to maintain the IP address lease open as needed.

In the context of the client, whether the system is configured as in FIG. 4 or FIG. 5 is irrelevant; it is provided with an IP address and responses received from the router R are in the same format in both cases. However, because the router R is configured according to the interface on which the request is received, it is possible to have several different configurations provided by the router R. For example, certain requests may be handled in the manner of FIG. 4, i.e. with the router R acting as the DHCP server, whereas others are handled in the manner of FIG. 5, with the router acting as a relay agent and using an external DHCP server to provide the IP addresses.

At the end of an IP address lease, the address is released and the client loses its IP connection. The next DHCP discover from that client on that interface will be treated as new and may be handled in a different way to the way in which it was previously.

The dynamic nature of the router configuration means that it is relatively easy to control the system to adapt to new services or providers, and does not require manual re-configuration of each router. This avoids the need to manually reconfigure every router once a new server or service is added to the system.

Further changes can be made within the scope of the invention. For example, in one further embodiment, some control system functionality is provided in the router R. In one example of such functionality, the control system may inspect the clients' DHCP discover message, in particular fields containing the client MAC address and the vendor-id field which are used to determine what type of client service causes the request for the IP address. Moving this functionality to the router R involves providing a set of service templates in the router R. When the client issues a DHCP discover, the router R inspects the DHCP discover message and attempts to match it against templates in a service list of client conditions. If a match is found in the list, that means that the particular service can be provided to the client. The service template can in turn also indicate that the packet should be relayed to an external DHCP server, the router's own internal DHCP server used, or a query sent to the control system for additional configuration information for the client.

This approach has the advantage that it provides a way to avoid the control system from the signalling chain, thus reducing the potential for every IP address assignment to be a possible single-point-of-failure. This general process would comprise analysing the message from the client to determine the service type, and then either configuring the router according to a stored template to either act as the DHCP server or to relay the request to an external DHCP server, or to pass the message on to the control system and respond in the same manner as is discussed above.

The invention claimed is:

1. A method of configuring a router to provide DHCP IP address services to a number of network clients sending messages to the router to request IP addresses, wherein the network clients connect to a network via the router which is under the control of a control system, the method comprising the steps of:
   i) obtaining configuration instructions at the router by sending messages from the router to the control system to request configurations for DHCP services;
   ii) receiving, at the router from the control system, configuration instructions generated by the control system based on a determination of whether the router should act, for a network client requesting an IP address from the router, as a DHCP server or a relay agent for an external DHCP server, wherein said determination is made by the control system according to at least one pre-defined criterion; and
   iii)) configuring the router in accordance with the configuration instructions to:
      a) in response to at least one client request, act as a DHCP server and provide an IP address; and
      b) in response to at least one other client request, act as a relay agent and forward the request from said at least one other client to an external DHCP server and forward an IP address response from the external DHCP server to said at least one other client.

2. The method as claimed in claim 1, further comprising the request from the client to determine a service type to which the request relates and creating a configuration instruction according to the determined service type.

3. The method as claimed in claim 2, wherein the step of obtaining a configuration instruction comprises creating the configuration instruction in the router from one of a number of configuration templates according to the service type.

4. The method as claimed claim 2, further comprising sending a message from the router to the control system to request a configuration for DHCP services according to the determined service type.

5. The method as claimed in claim 1, wherein the configuration instruction comprises an instruction including an IP address pool from which the router can assign an address to the client when acting as a DHCP server.

6. The method as claimed in claim 1, wherein the configuration instruction comprises an instruction including the identity of the external DHCP server to which the IP address request is relayed.

7. The method as claimed in claim 6, comprising sending relay agent information with the request to the external DHCP server.

8. The method as claimed in claim 6, wherein more than one external DHCP server is identified.

9. The method as claimed in claim 1 wherein, when the router is under the control of a control system and is configured to act as a relay agent, the router sends an update message to the control system when forwarding the IP address from the external DHCP server to the client.

10. A router within a network system comprising the router, a number of network clients, and a network control system, wherein the network clients connect to a network via the router and the router is under the control of the control system, the router being configured to:
   i) obtain configuration instructions by sending messages from the router to the control system to request configurations for DHCP services;
   ii) receive, by the router from the control system, configuration instructions generated by the control system based on a determination of whether the router should act, for a network client requesting an IP address from the router, as a DHCP server or a relay agent for an external DHCP server, wherein said determination is made by the control system according to at least one pre-defined criterion;
   iii) in accordance with the configuration instructions, act, in response to at least one client request, as a DHCP server and provide an IP address; and
   act, in response to at least one other client request, as a relay agent and forward the request from said at least one other client to an external DHCP server and to forward an IP address response from the external DHCP server to said at least one other client.

11. The router as claimed in claim 10, wherein the network system further comprises at least one external DHCP server and a network control system.

12. The router as claimed in claim 10, wherein the configuration instructions received by the router from the control system comprise an instruction including an IP address pool from which the router can assign an address to the client when acting as a DHCP server.

13. A method of instructing a router to provide DHCP IP address services to a number of network clients sending messages to the router to request IP addresses, wherein the network clients connect to a network via the router which is under the control of a control system, the method comprising:
   i) receiving, at the control system from a router, a message for requesting configuration instructions for DHCP services;
   ii) determining, by the control system based on at least one pre-defined criterion, whether the router should act, for a network client requesting an IP address from the router, as a DHCP server or a relay agent for an external DHCP server;

iii) sending, from the control system to the router, configuration instructions generated by the control system based on said determining for configuring the router to:
  a) in response to at least one client request, act as a DHCP server and provide an IP address; and
  b) in response to at least one other client request, act as a relay agent and forward the request from said at least one other client to an external DHCP server and forward an IP address response from the external DHCP server to said at least one other client.

14. The method as claimed in claim 13, wherein the configuration instructions sent from the control system to the router comprise an instruction including an IP address pool from which the router can assign an address to the client when acting as a DHCP server.

15. A control system within a network system comprising a number of routers and a number of network clients, wherein each network client connects to a network via an associated router and the router is under the control of the control system, wherein the control system comprises at least one processor coupled to a memory, the control system being configured to:
  i) receive, from a router, a message for requesting configuration instructions for DHCP services;
  ii) determine, based on at least one pre-defined criterion, whether the router should act, for a network client requesting an IP address from the router, as a DHCP server or a relay agent for an external DHCP server;
  iii) send, from the control system to the router, configuration instructions generated by the control system based on said determining for configuring the router to:
    a) in response to at least one client request, act as a DHCP server and provide an IP address; and
    b) in response to at least one other client request, act as a relay agent and forward the request from said at least one other client to an external DHCP server and forward an IP address response from the external DHCP server to said at least one other client.

16. The control system as claimed in claim 15, wherein the configuration instructions sent from the control system to the router comprise an instruction including an IP address pool from which the router can assign an address to the client when acting as a DHCP server.

17. A method of configuring a router to provide DHCP IP address services to a number of network clients sending messages to the router to request IP addresses, wherein the network clients connect to a network via the router which is under the control of a control system, the method comprising:
  i) in response to a request for IP address received at the router, the router determining whether it should act, for a network client requesting an IP address from the router, as a DHCP server or a relay agent for an external DHCP server, wherein said determining is based on at least one pre-defined criterion;
  ii) configuring the router to:
    a) act as a DHCP server and to provide an IP address to the network client, when it is determined that the router should act, for the network client requesting an IP address from the router, as a DHCP server; and
    b) act as a relay agent and forward the request from at least one other client to an external DHCP server and forward an IP address, when it is determined that the router should act, for said at least one other client requesting an IP address from the router as a relay agent for an external DHCP server, response from the external DHCP server to said at least one other client.

18. A router within a network system comprising a number of routers, a number of network clients, and a network control system, wherein each network client connects to a network via an associated router and the router is under the control of the control system, the router being configured to:
  i) determine, in response to a request for IP address received at the router, whether it should act, for a network client requesting an IP address from the router, as a DHCP server or a relay agent for an external DHCP server, wherein said determining is based on at least one pre-defined criterion;
  ii)
    a) act as a DHCP server and to provide an IP address, when it is determined that the router should act, for the network client requesting an IP address from the router, as a DHCP server; and
    b) act as a relay agent and forward the request from at least one other client to an external DHCP server and forward an IP address response from the external DHCP server to said at least one other client, when it is determined that the router should act, for said at least one other client requesting an IP address from the router as a relay agent for an external DHCP server.

* * * * *